(12) United States Patent
Murata

(10) Patent No.: US 8,555,940 B2
(45) Date of Patent: Oct. 15, 2013

(54) PNEUMATIC TIRE WITH TREAD HAVING CIRCUMFERENTIAL GROOVES

(75) Inventor: Takehiko Murata, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 819 days.

(21) Appl. No.: 12/681,537

(22) PCT Filed: Sep. 30, 2008

(86) PCT No.: PCT/JP2008/067729
§ 371 (c)(1),
(2), (4) Date: Apr. 2, 2010

(87) PCT Pub. No.: WO2009/044727
PCT Pub. Date: Apr. 9, 2009

(65) Prior Publication Data
US 2010/0212795 A1    Aug. 26, 2010

(30) Foreign Application Priority Data

Oct. 3, 2007    (JP) ................................ 2007-260086

(51) Int. Cl.
*B60C 11/13* (2006.01)
(52) U.S. Cl.
USPC .............. 152/209.8; 152/209.9; 152/209.15; 152/209.21; 152/209.24; 152/209.27; 152/DIG. 3
(58) Field of Classification Search
USPC ............... 152/209.8, 209.9, 209.15, 209.18, 152/209.21, 209.24, 209.27, DIG. 3
See application file for complete search history.

(56) References Cited

U.S. PATENT DOCUMENTS

| 5,031,680 A * | 7/1991 | Kajikawa et al. ........ 152/209.18 |
| 2005/0076986 A1* | 4/2005 | Saguchi .................... 152/209.21 |
| 2005/0092413 A1 | 5/2005 | Miyazaki |

FOREIGN PATENT DOCUMENTS

| GB | 1549347 A | * | 8/1979 |
| JP | 62-49402 U | | 3/1987 |
| JP | 3-271006 A | | 12/1991 |
| JP | 2002-219909 A | | 8/2002 |
| JP | 2002-293109 A | | 10/2002 |
| JP | 2005-132239 A | | 5/2005 |

* cited by examiner

Primary Examiner — Steven D Maki
(74) Attorney, Agent, or Firm — Birch, Stewart, Kolasch & Birch, LLP

(57) ABSTRACT

A pneumatic tire having on-snow performance improved by increasing traction performance on snow-covered road with maintaining dry grip performance high, and comprising tread surface 2 having at least one circumferential main groove 3 in an outer region 2o facing outward of a vehicle, the circumferential main groove 3 being a straight groove wherein ridge lines 21 at which groove wall surfaces 20 intersect with the tread surface 2 extend straight, each groove wall surface 20 comprising a gently-inclined upper wall surface 20U extending from the ridge line 21 at an angle θ1 of 40 to 60° with respect to a normal line to tread surface 2 and a steeply-inclined lower wall surface 20L extending to groove bottom 22 at an angle θ2 smaller than the angle θ1, and the lower wall surface 20L including projections 23 which are disposed at intervals in the circumferential direction and have a triangular cross section with slope surface 23S extending from lower end Ue of the upper wall surface 20U to groove bottom 22 at an angle θ3 which is not greater than the angle θ1 but is greater than the angle θ2.

7 Claims, 9 Drawing Sheets

PNEUMATIC TIRE WITH TREAD HAVING CIRCUMFERENTIAL GROOVES

TECHNICAL FIELD

The present invention relates to a pneumatic tire suitable for use as an all season tire and having an on-snow performance improved with maintaining a running performance on dry roads at a high level.

BACKGROUND ART

For all season tires having a good running performance on snow-covered roads (i.e., on-snow performance) improved with maintaining a high speed running performance, it is important to enhance a traction performance on snow-covered roads. For this purpose, zigzag grooves have been generally used as circumferential main grooves extending in a circumferential direction of tire. However, as shown in FIG. 11(A), external corner portions "g1a" projecting toward a groove width center side in zigzag grooves "g1" are low in rigidity and, therefore, amount of slip of these portions with a road is large. Therefore, there is a problem that such an uneven wear that the external corner portions "g1a" are worn away early generates to result in lowering of dry grip performance. In particular, since a large load is applied during cornering to an outer region of a tread surface which is located on an outer side of a vehicle, circumferential main grooves disposed in the outer region cause uneven wear more markedly. Moreover, since an influence of uneven wear on cornering force is also great, lowering of the dry grip performance is further accelerated.

On the other hand, it is also known to use, as a circumferential main groove, a straight groove which extends straight in the circumferential direction. However, since no traction force is obtained by the straight groove on snow-covered roads, the on-snow performance cannot be enhanced and, therefore, the straight groove is disadvantageous to all season tires. Furthermore, although the straight groove causes less uneven wear, corner portions "q" at which groove wall surfaces "gs" intersect with a tread surface "ts" as shown in FIG. 11(B) are low in rigidity. Therefore, when a straight groove is disposed in the outer region mentioned above, uneven wear resistance is still on an unsatisfactory level such that the corner portions "q" are worn away early by a large load generating at the time of cornering at a high speed.

DISCLOSURE OF THE INVENTION

Problem to be Solved by the Invention

Particularly in recent years, further improvement in running performance on dry roads and running performance on snow-covered roads is desired also for all season tires from the viewpoints of recent demands for high running speed and high output of vehicles. Thus, tires having an excellent uneven wear resistance and having an improved on-snow performance obtained by enhancing a traction performance on snow-covered roads with maintaining the dry grip performance at a high level are strongly demanded to appear.

Accordingly, it is an object of the present invention to provide a pneumatic tire having an excellent uneven wear resistance and capable of improving the on-snow performance by enhancing a traction performance on snow-covered roads with maintaining the dry grip performance at a high level. The present invention is based on using such a straight groove that a groove wall surface comprises a gently-inclined upper wall portion and a steeply-inclined lower wall portion as a circumferential main groove to be disposed in the outer region mentioned above and disposing convex portions which have a triangular cross section and which project toward a groove width center side, at the lower wall portion at intervals in the circumferential direction.

The following tires are known as a tire having convex portions disposed at a groove wall surface at intervals in the circumferential direction.

Patent Literature 1: JP-A-2002-219909
Patent Literature 2: JP-A-2002-293109

Means to Solve the Problem

The present invention is characterized in that at least one outer region circumferential main groove extending continuously in a circumferential direction of a tire is disposed in an outer region of a tread surface which faces outward of a tire equator with respect to a vehicle, the outer region circumferential main groove is formed into a straight groove such that each of ridge lines at which groove wall surfaces on both sides of the groove intersect with the tread surface extends straight in the circumferential direction, each of the groove wall surfaces comprises a gently-inclined upper wall surface portion which extends downwardly from each of the ridge lines at an angle $\theta 1$ of 40 to 60° with respect to a normal line to the tread surface, and a steeply-inclined lower wall surface portion which is continuous with a lower end of the upper wall surface portion and extends up to a groove bottom at an angle $\theta 2$ smaller than the angle $\theta 1$, and the lower wall surface portion is provided with projections disposed at intervals in the circumferential direction, the projections having a triangular cross section and projecting from the lower wall surface portion toward a groove width center with a slope surface extending from the lower end of the upper wall surface portion up to the groove bottom at an angle $\theta 3$ which is not greater than the angle $\theta 1$ but is greater than the angle $\theta 2$.

A term "ground contact edge" as used herein means an axially outer edge of a tread ground contact surface of a tire which comes into contact with a ground when the tire is mounted on a normal rim and inflated to a normal inner pressure and the tire in such a condition is then loaded with a normal load. Further, an axial distance between the ground contact edges is referred to as "tread ground contact width". The term "normal rim" means a rim defined for every tire in a standardizing system on which the tire is based and, for example, denotes "standard rim" in JATMA, "Design Rim" in TRA and "Measuring Rim" in ETRTO. Also, the term "normal inner pressure" means an air pressure defined for every tire in the standardizing system and is, for example, the "maximum air pressure" in JATMA, the maximum value recited in the table of "Tire Load Limits at Various Cold Inflation Pressures" in TRA, and the "Inflation Pressure" in ETRTO, provided that in case of tires for passenger cars, the "normal inner pressure" is 180 kPa. Further, the term "normal load" means a load defined for every tire in the standardizing system and is, for example, the maximum load capacity in JATMA, the maximum value recited in the table of "Tire Load Limits at Various Cold Inflation Pressures" in TRA, and the "Load Capacity" in ETRTO.

A "groove width" denotes a width on the tread surface measured in a right angle direction to a groove center.

Effects of the Invention

As stated above, in the present invention, a straight groove that ridge lines at which groove wall surfaces intersect with the tread surface extend straight in the circumferential direction, is used as a circumferential main groove to be disposed in the outer region. Therefore, generation of uneven wear as resulting from external portions of a zigzag groove can be prevented. Moreover, the groove wall surface is formed of a gently-inclined upper wall portion and a steeply-inclined lower wall portion. Since the upper wall surface portion is gently-inclined, it functions as a chamfered portion that a corner portion of the groove wall surface and the tread surface is cut out, so generation of uneven wear resulting from the corner portion can be prevented uniformly over a full length of the circumferential main groove.

Further, the projections projecting from the lower wall surface portion toward the center of the groove width exhibit a traction force on snow-covered road based on circumferential end surfaces of the projections, whereby the on-snow performance can be enhanced. In particular, since the projections have a triangular cross section, the tire is excellent in a performance of biting into snow and a performance of expelling the snow from the groove and, moreover, lowering of the drainage performance can be suppressed.

BRIEF DESCRIPTION OF THE DRAWINGS

FIG. 2 is a development view of a tread pattern showing an outer shoulder region in an enlarged from;

EXPLANATION OF SYMBOLS

Figure 1:
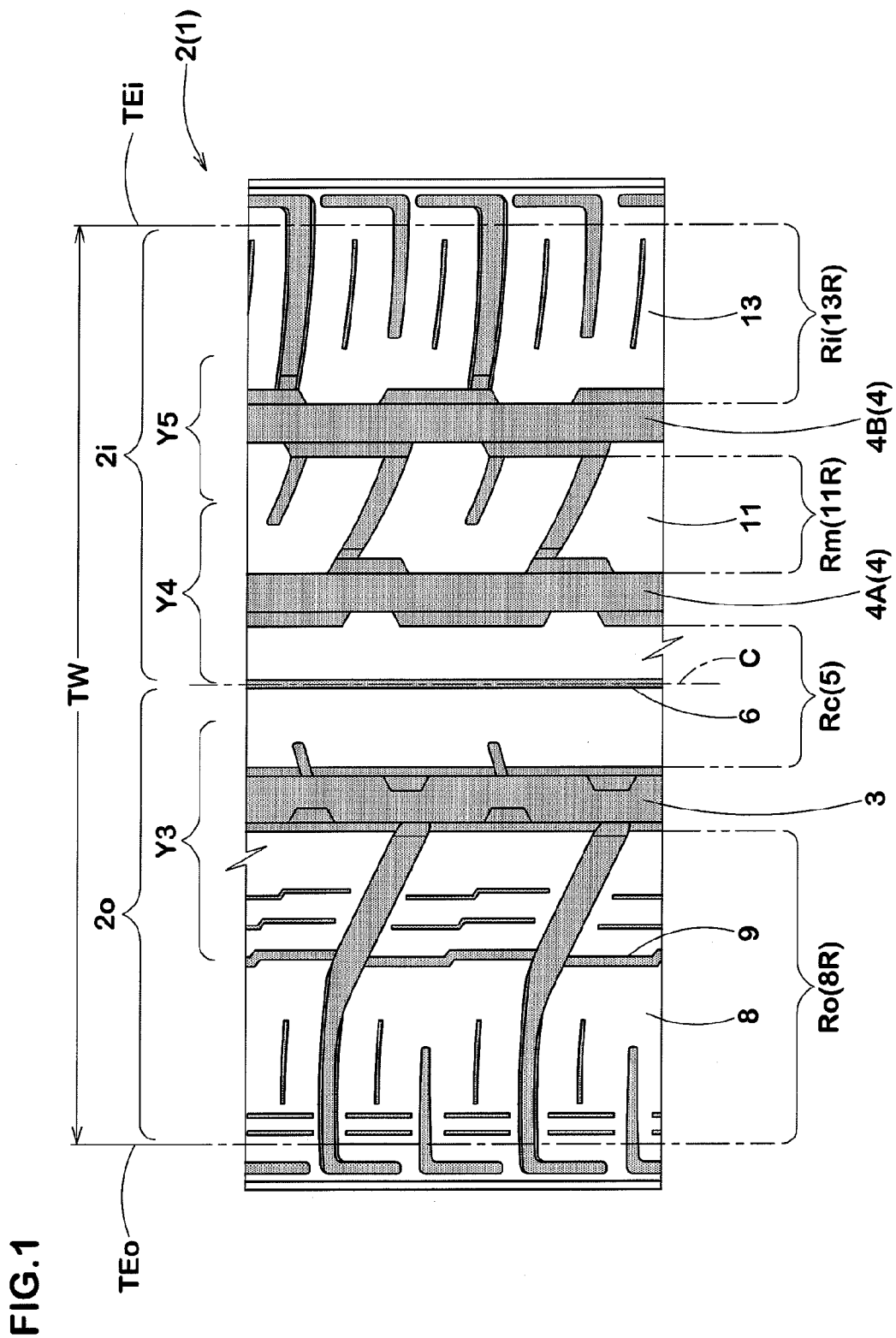
FIG. 1 is a development view showing a tread pattern of a pneumatic tire according to the present invention.

2. Tread surface
2*o*. Outer region
3. Outer region circumferential main groove
4. Inner region circumferential main groove
8, 11, 13. Block
8R, 11R, 13R. Block row
9. Circumferential sub-groove
10, 12. Lateral groove
20. Groove wall surface
20U. Upper wall surface portion
20L. Lower wall surface portion
21. Ridge line
22. Groove bottom
23. Projection
23S. Slope surface
25. Groove wall surface
25*a*. First groove wall portion
25*b*. Second groove wall portion
26. Ridge line
26*a*. First ridge line portion
26*b*. Second ridge line portion
C. Tire equator
Ri. Inner shoulder region
Ro. Outer shoulder region
TEo. Ground contact edge of outer region
TEi. Ground contact edge of inner region
Ue. Lower end of upper wall surface portion

BEST MODE FOR CARRYING OUT THE INVENTION

An embodiment of the present invention will be explained with reference to the accompanying drawings. FIG. 1 is a development view showing a tread pattern of a pneumatic tire according to the present invention.

As shown in FIG. 1, a pneumatic tire 1 in this embodiment has a tread surface 2 virtually divided by a tire equator C into an outer region facing outward of a vehicle and an inner region 2*i* facing inward of the vehicle. In the outer region 2*o* is disposed at least one outer region circumferential main groove 3 extending in a circumferential direction of the tire (in this embodiment, one outer region circumferential main groove 3). In the inner region 2*i* is disposed at least one inner region circumferential main groove 4 extending in the circumferential direction (in this embodiment, a total of two grooves consisting of a first inner region circumferential main groove 4A located on a tire equator side and a second inner region circumferential main groove 4B located on a ground contact edge side). Thus, these circumferential main grooves form an asymmetrical tread pattern in the tread surface 2, e.g., in case of this embodiment, an asymmetrical tread pattern wherein three circumferential main grooves 3, 4A, 4B are disposed asymmetrically with respect to the tire equator C.

If the number of the circumferential main grooves disposed is two, the tire is short of the drainage performance or the like, so it is difficult to secure a sufficient wet performance. If the number of the circumferential main grooves disposed is four, the pattern rigidity, particularly rigidity in the axial direction of the tire, is insufficient, so the tire, particularly the tire intended for high-speed vehicles such as sports cars (including race cars), is short of the dry grip performance. Therefore, it is preferable to form three circumferential main grooves from the viewpoint of achieving both the wet performance and the dry grip performance. Although a large load acts on the outer region 2*o* in cornering, an axial rigidity of the outer region 2*o* can be relatively enhanced to increase a cornering force by applying an asymmetric arrangement as in this embodiment, thus improving the dry grip performance, particularly the cornering performance.

It is preferable that a range Y3 of a region where the outer region circumferential main groove 3 is formed is between a position of 20% of a tread ground contact width TW from a ground contact edge TEo located in the outer region and a position of 46% of the tread ground contact width TW from the ground contact edge TEo. The whole of the circumferential main groove 3 is formed in this region range Y3. It is more preferable that the region range Y3 is between a position of 25% of the tread ground contact width TW and a position of 35% of the tread ground contact width TW. Further, it is preferable that a range Y4 of a region for forming the first inner region circumferential main groove 4A is within the inner region 2i and is between a position of 50% of the tread ground contact width TW from the ground contact edge TEo located in the outer region and a position of 70% of the tread ground contact width TW from the ground contact edge TEo. Further, it is preferable that a range Y5 of a region for forming the second inner region circumferential main groove 4B is within the inner region 2i and is between a position of 70% of the tread ground contact width TW from the ground contact edge Teo located in the outer region and a position of 86% of the tread ground contact width TW from the ground contact edge Teo.

A rigidity balance in the axial direction of the tire can be made proper to further enhance the dry grip performance (particularly cornering performance) by forming the circumferential main grooves 3, 4A, 4B in such region ranges Y3, Y4, Y5.

Figure 6:
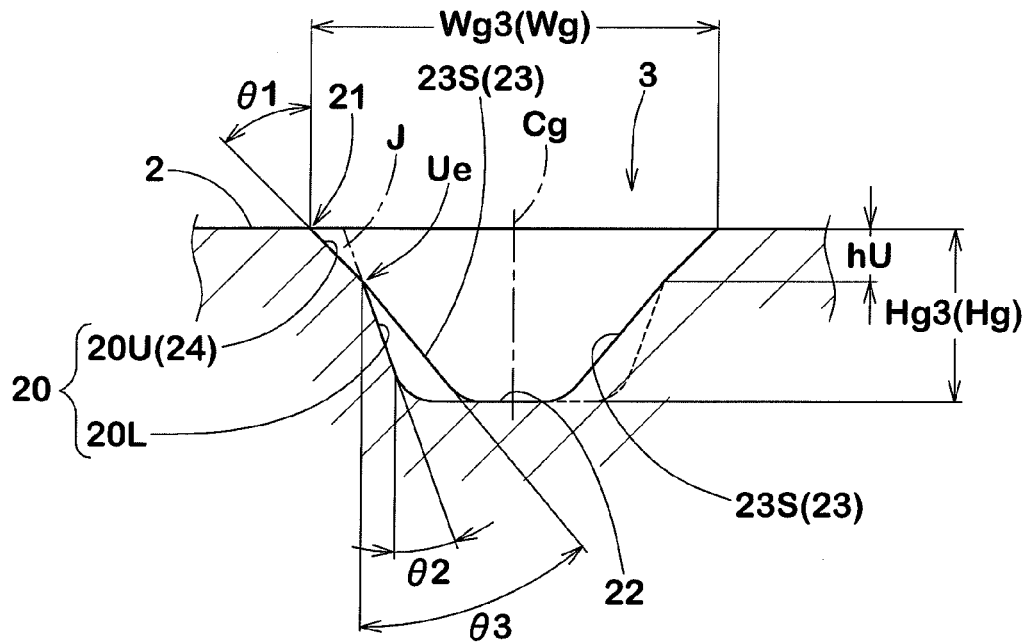
FIG. 6 is a cross sectional view taken on line A-A in FIG. 4 showing an outer region circumferential main groove.
Figure 7:
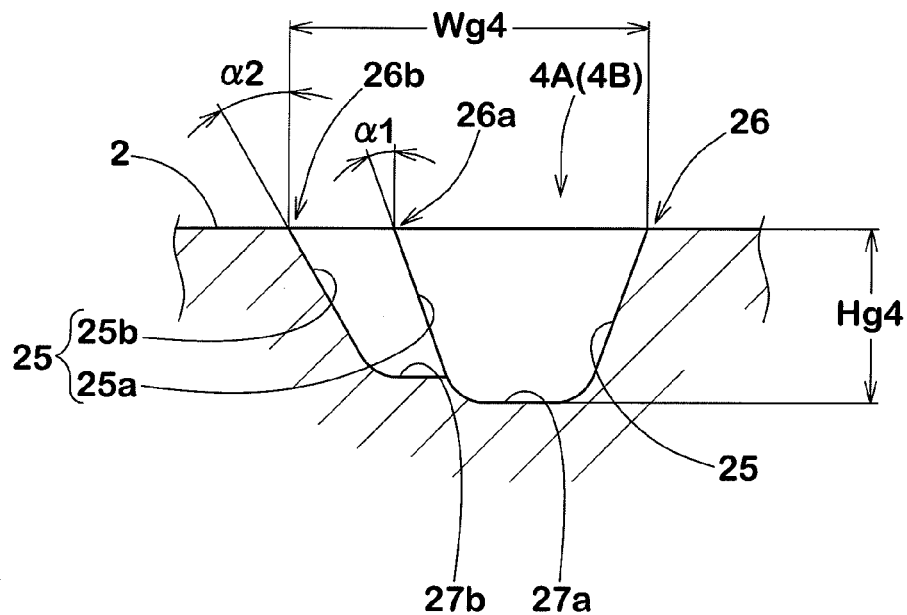
FIG. 7 is a cross sectional view taken on line B-B in FIGS. 5(A) and 5(B) showing an inner region circumferential main groove.

The circumferential main grooves 3, 4A, 4B have a groove width Wg3, Wg4 (generically referred to as Wg) of at least 8 mm, as shown in FIGS. 6 and 7 showing the cross sections thereof. In this embodiment, the width Wg3 of the circumferential main groove 3 is set larger than the width Wg4 of the circumferential main grooves 4A and 4B, thereby suppressing lowering of balance of drainage performance owing to the asymmetric arrangement. From the viewpoint of a balance between the dry grip performance and the wet performance, it is preferable that the groove width Wg3 is from 5 to 9% of the tread ground contact width TW, and the groove width Wg4 is from 4 to 8% of the tread ground contact width TW.

It is preferable that groove depths Hg3 and Hg4 (generically referred to as Hg) of the circumferential main grooves 3, 4A and 4B are identical to each other within the range of 6.5 to 9.0 mm, especially 7.0 to 8.0 mm. The reason is that if the groove depth Hg is large, it is required for preventing damages at groove bottom to increase the thickness of the tread rubber and, as a result, heat generation during running tends to increase to cause, particularly in high speed vehicle tire, abnormal wear (premature wear) owing to thermal deterioration of rubber. Therefore, from the viewpoints of drainage performance and prevention of thermal deterioration, it is preferable to select the groove depth Hg from the range mentioned above.

Figure 4:
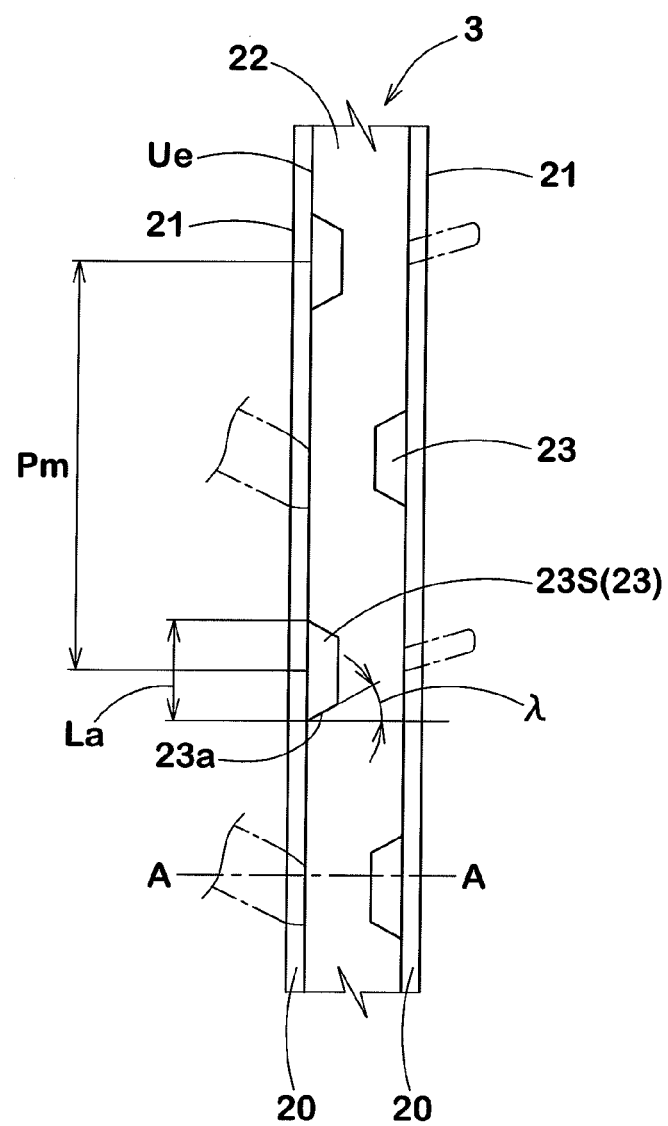
FIG. 4 is a plan view showing an outer region circumferential main groove.

As shown in FIGS. 4 and 6, the circumferential main groove 3 is formed into a straight groove such that each of ridge lines 21 at which groove wall surfaces 20 on both sides of the groove intersect with the tread surface 2 extends straight in the circumferential direction, and each of the groove wall surfaces 20 is formed of a gently-inclined upper wall surface portion 20U which extends downwardly from each of the ridge lines 21 at an angle θ1 of 40 to 60° with respect to a normal line to the tread surface 2, and a steeply-inclined lower wall surface portion 20L which is continuous with a lower end Ue of the upper wall surface portion 20U and extends up to a groove bottom 22 at an angle θ2 smaller than the angle θ1. Furthermore, projections 23 projecting from the lower wall surface portion 20L toward a groove width center are disposed at the lower wall surface portion 20L at intervals in the circumferential direction. The projections 23 have a triangular cross section with a slope surface 23S extending from the lower end Ue of the upper wall surface portion 20U up to the groove bottom 22 at an angle θ3 which is not greater than the angle θ1 but is greater than the angle θ2.

Like this, the circumferential main groove 3 to be disposed in the outer region 2o is formed into a straight groove that the ridge lines 21 extend straight in the circumferential direction. Therefore, external portions and internal portions as seen in a zigzag groove where the rigidity varies are not formed, so generation of uneven wear caused thereby can be prevented. Moreover, a tread surface side of the groove wall surface 20 is formed by the gently-inclined upper wall surface portion 20U. Since the upper wall surface portion 20U is a gently-inclined surface of an angle θ1 of 40 to 60°, it functions as a chamfered portion 24 where a corner portion J between the groove wall surface 20 and the tread surface 2 is cut out, so generation of uneven wear resulting from the corner portion J can be prevented over a full length of the circumferential main groove 3. That is to say, variations in rigidity along the ridge lines 21 can be suppressed by forming the circumferential main groove 3 into a straight groove. Moreover, the gently-inclined upper wall surface portion 20U serves as a chamfered portion 24, whereby the rigidity at the ridges 21 can be maintained high. As a result, even in running including high speed cornering (e.g., marginal running in a race circuit), uneven wear owing to the circumferential main groove 3 can be suppressed. Therefore, change in dry grip performance during running is suppressed, whereby the running stability can be secured.

Further, the projections 23 projecting from the lower wall surface portion 20L generate a force of shearing a snow column in the circumferential main groove 3 to exhibit a traction force on snow-covered road. Moreover, since the projections 23 have a triangular cross section with the slope surface 23S, the tire is excellent in a performance of biting into snow and a performance of expelling the snow from the groove and, moreover, lowering of the drainage performance can be suppressed.

It is preferable that a depth hU of the upper wall surface portion 20U from the tread surface 2 is within the range of 5 to 50%, especially 20 to 40%, of the groove depth Hg3 of the circumferential main groove 3. If the depth hU is less than 5%, uneven wear generating in marginal running or the like tends not to be sufficiently suppressed. If the depth hU is more than 50%, the groove width becomes too large, so the ground contact area is decreased to bring about disadvantages in dry grip performance. Similarly, if the angle θ1 is less than 40°, the effect of suppressing uneven wear is not sufficient, and if the angle θ1 is more than 60°, the ground contact area is excessively decreased, resulting in lowering of the dry grip performance.

It is preferable that the angle θ2 of the lower wall surface portion 20L is within the range of 5 to 45°, especially 15 to 30°. If the angle θ2 is more than 45°, the groove volume is decreased, so the drainage performance (wet performance) and on-snow performance are not satisfactory. On the other hand, angle θ2 of less than 5° is disadvantageous in on-snow performance, since the performance of discharging snow caught by the groove (i.e., snow-expelling performance) is impaired. Further, if an angle difference (θ1−θ2) is small, the projecting amount of the projection 23 is small, so generation of the traction force is insufficient. Therefore, it is preferable that the angle difference (θ1−θ2) is 5° or more.

As to the projections 23, it is preferable that the angle θ3 of the slope surface 23S falls within the range of θ1≥θ3>θ2 and that, from the viewpoint of traction force on snow-covered road, an angle difference (θ3−θ2) is 5° or more in the same manner as the angle difference (θ1−θ2). The angle θ3 of the projections 23 may be the same as the angle θ1. In that case, the upper wall surface portion 20U and the slope surface 23S forms a single plane surface. The projections 23 may extend toward the opposite wall surface beyond a groove width center Cg, but it is preferable from the viewpoint of retaining the drainage performance that the projections 23 extend to terminate before the groove width center Cg without extending beyond it. As shown in FIG. 4, it is preferable from the viewpoint of traction force that circumferential end surfaces 23a of the projections 23 are inclined at an angle λ, of at most 30° with respect to an axial direction of the tire.

An circumferential average pitch Pm between circumferentially adjacent projections 23, 23 is from 30 to 90% of a circumferential length of the tread ground contact surface (tread ground contact length). If the average pitch Pm is more than 90%, the number of projections 23 to be formed is too small and accordingly it is difficult to secure a sufficient traction force. The term "circumferential average pitch Pm" denotes a value obtained by dividing a circumferential length of the circumferential main groove 3 by the number of projections 23 formed. The projections 23 are arranged, for example, by a variable pitch method. If the circumferential average pitch Pm is less than 30%, the snow-expelling performance and the drainage performance may be decreased. A circumferential length La of the projections 23 is preferably from 30 to 80% of the circumferential average pitch Pm. If the length La is less than 30%, the snow-expelling performance tends to lower to cause clogging of groove with snow. If the length La is more than 80%, the strength of a snow column itself is decreased to lead to lowering of traction force. The projections 23 to be disposed at one groove wall surface 20 and the projections 23 to be disposed at the other groove wall surface 20 are disposed at circumferentially different positions from each other in a zigzag relationship.

Figure 8A:
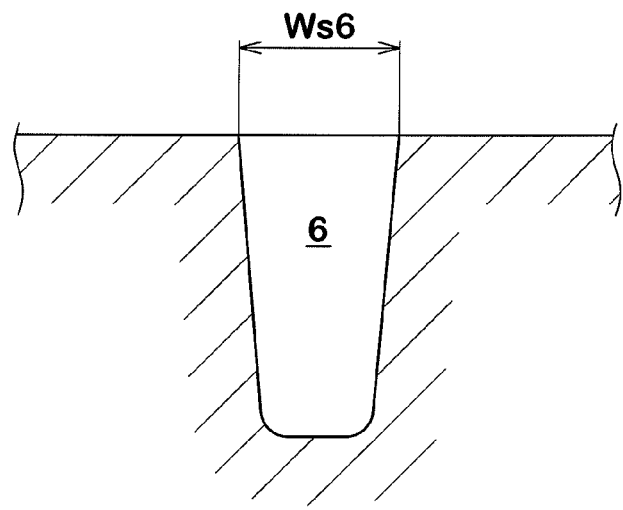
FIG. 8(A) is a cross sectional view showing a circumferential sub-groove in a center region.

In case of straight running, the ground contact pressure is the largest at a central region Rc located between the outer region circumferential main groove 3 and the first inner region circumferential main groove 4A, as shown in FIG. 1. Therefore, if a block row is formed in the central region Rc, the rigidity becomes insufficient, thus resulting in deterioration of straight running performance, and there is a disadvantage that marked heel and toe wear occur in the block row. Therefore, in this embodiment, the central region Rc is formed as a rib 5 continuously extending in the circumferential direction of the tire without being divided by lateral grooves. This rib 5 is provided with a narrow straight circumferential sub-groove 6 (the cross section of which is shown in FIG. 8A) extending continuously in the circumferential direction and having a groove width Ws6 of less than 5 mm. The circumferential sub-groove 6 can enhance the wet performance in the central region Rc with maintaining its rigidity high. Furthermore, abnormal abrasion in high speed running owing to thermal deterioration of a rubber can be suppressed by a heat radiation effect of the sub-groove 6. In this embodiment is shown a case where the circumferential sub-groove 6 is disposed on the tire equator C.

Figure 2:
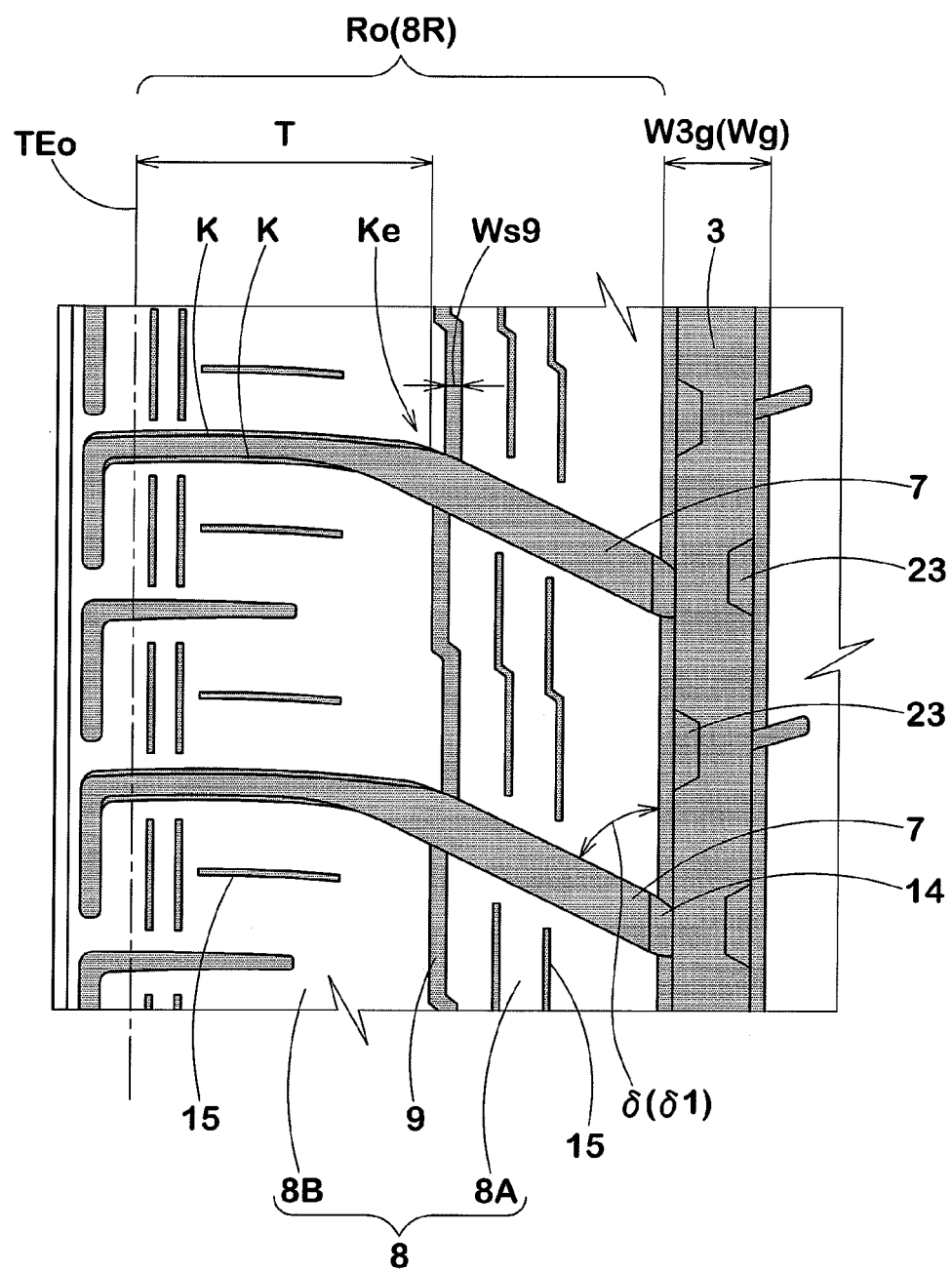
Figure 8B:
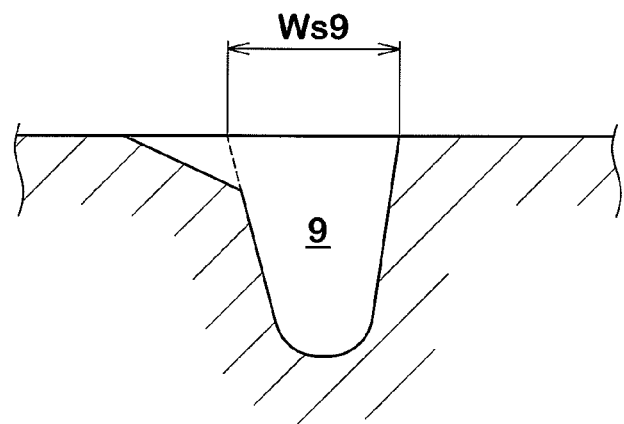
FIG. 8(B) is a cross sectional view showing a circumferential sub-groove in an outer shoulder region.

In an outer shoulder region Ro located between the outer region circumferential main groove 3 and the ground contact edge Teo are disposed, as shown in FIG. 2 in an enlarged form, outer lateral grooves 7 crossing the outer shoulder region Ro in the axial direction, whereby the outer shoulder region Ro is formed as an outer block row 8R in which outer blocks 8 are disposed at intervals in the circumferential direction. In the outer shoulder region Ro are further disposed a narrow circumferential sub-groove 9 (the cross section of which is shown in FIG. 8B) extending continuously in the circumferential direction and having a groove width Ws9 of less than 8 mm, thereby dividing each outer block 8 into a first block portion 8A located on the tire equator side and a second block portion 8B located on the ground contact edge side.

The outer lateral grooves 7 shown in this embodiment are inclined grooves extending at an angle δ of 40 to 90° with respect to the circumferential direction. The outer lateral grooves 7 form an angle δ1 of 40 to 80° at intersecting parts with the circumferential main groove 3, and the angle δ gradually increases toward the ground contact edge TEo. The outer lateral grooves 7 can include a linear part extending at a constant angle α. The outer lateral grooves 7 can smoothly discharge rainwater to the outside of the ground contact surface based on the inclination thereof and therefore can enhance the wet performance with suppressing lowering of circumferential rigidity.

Figure 9:
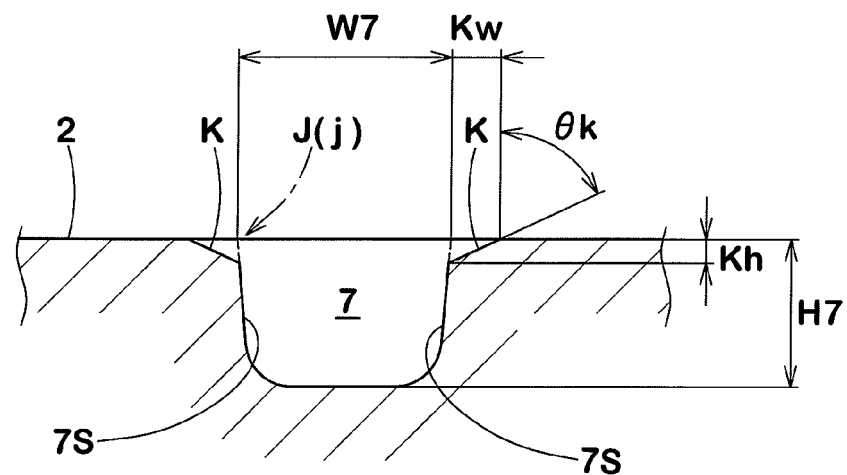
FIG. 9 is a cross sectional view for illustrating a cutout portion in an outer lateral groove.

As shown in FIG. 9, a portion on the ground contact edge side of each lateral groove 7 is provided, at corner parts J on both sides thereof at which groove wall surfaces 7S of the lateral groove 7 intersect with the tread surface 2, with cutout portions K that intersection points "j" of the surfaces 2 and 7S are cut away, like a chamfered edge. Distance T from the ground contact edge Teo to an axially inner end Ke (shown in FIG. 2) of the cutout portion K is at most 25% of the tread ground contact width TW, and a cutout width Kw (shown in FIG. 9) of the cutout portion K is set to a range of 10 to 30% of a width W7 of the lateral grooves 7. The width W7 of the lateral grooves 7 shown in this embodiment gradually decreases toward the ground contact edge Teo. In case that the cutout portions K are formed, the groove width W7 is defined by a distance between the intersection points "j", "j". It is preferable that inclination angle θk of the cutout portions K to a normal line to the tread surface 2 is from 55 to 75°. Further, it is preferable that cutout depth Kh at the ground contact edge TEo is from 5 to 95% of a groove depth H7 of the lateral grooves 7. Such cutout portions K can suppress abrasion of the corner parts J of the outer blocks 8 and therefore can prevent the traction from lowering with minimizing decrease of the ground contact area.

The circumferential sub-groove 9 formed into a narrow groove can enhance the wet performance with suppressing lowering of rigidity of the blocks 8. The sub-groove 9 in this embodiment is formed into a zigzag groove, particularly a zigzag groove in the form of a rectangular wave, to enhance the traction on icy and snow-covered roads.

It is preferable that the number of lateral grooves 7 is the same as the number of projections 23, and each projection 23 is formed midway between the lateral grooves 7, 7 in the circumferential direction.

Figure 5A:
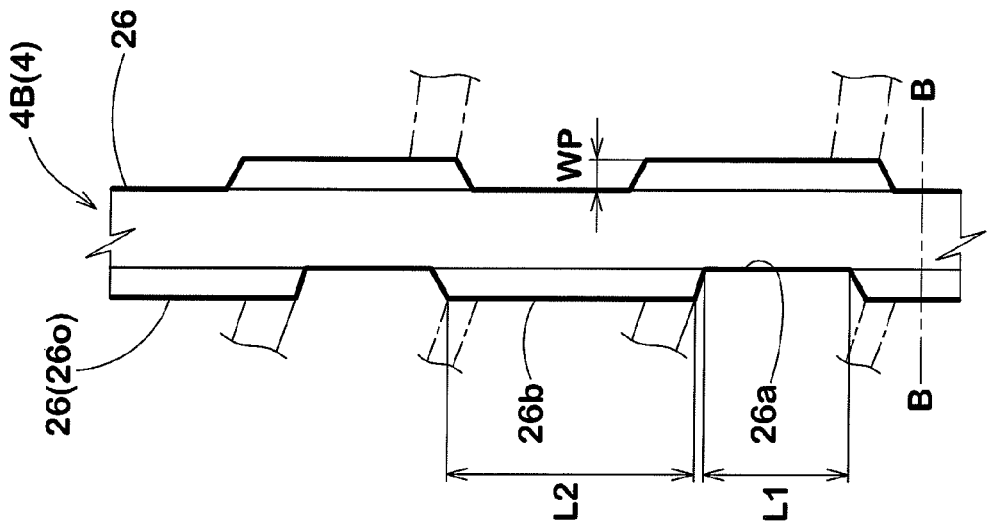
FIGS. 5(A) and 5(B) are plan views showing inner region circumferential main grooves.
Figure 5B:
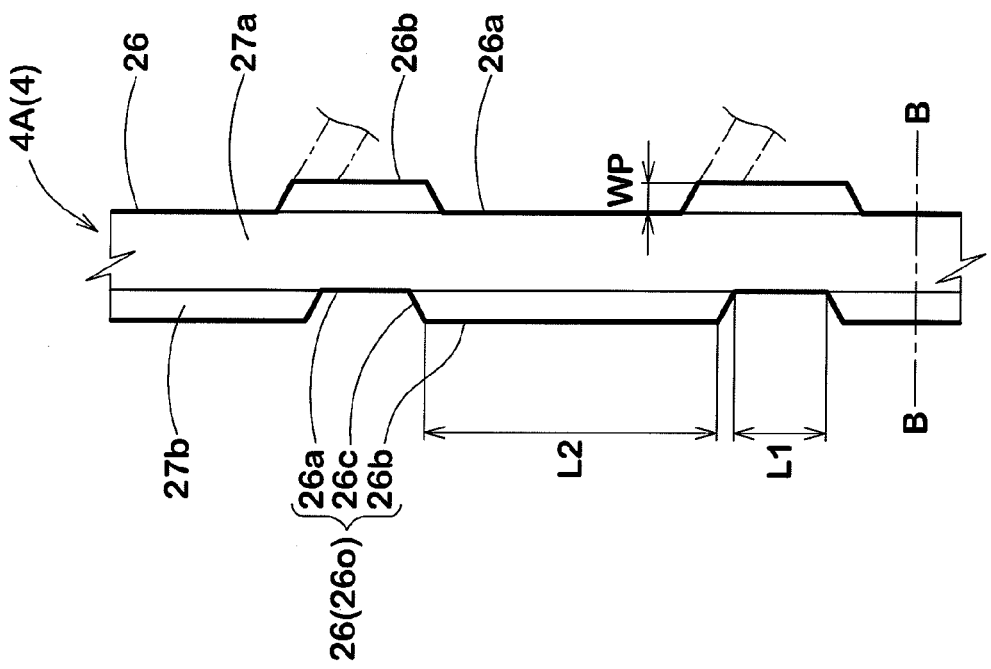

As shown in FIGS. 5(A), 5(B) and 7, two inner region circumferential main grooves 4A and 4B to be disposed in the inner region 2i are formed into a zigzag groove such that each of ridge lines 26 at which wall surfaces 25 on both sides of the grooves intersect with the tread surface 2 is in the form of a rectangular wave. Specifically, each ridge line 26 is in a rectangular wave-like form such that a first ridge line portion 26a on a groove width center side (a side near the groove width center) extending straight in the circumferential direction and a second ridge line portion 26b located outside of the first portions 26a (a side far from the groove width center) are alternately connected to each other through a connecting portion 26c having a small length. The connecting portions 26c are inclined at an angle of less than 45°, preferably at most 40°, with respect to the axial direction. Each groove wall surface 25 is composed of a first groove wall portion 25a extending from the first ridge line portion 26a to a groove bottom 27a and a second groove wall portion 25b extending from the second ridge line portion 26b to a groove bottom 27b. In this embodiment is shown a preferable case where the groove bottom 27a on the groove width center side is deeper than the groove bottom 27b located outside thereof, but the depth of the groove bottom 27a may be the same as that of the groove bottom 27b.

A load applied to the inner region 2i in marginal running is smaller as compared with the outer region 2o and, therefore, the inner region 2i is hard to cause uneven wear and has a smaller influence on cornering force. Therefore, it is possible to further enhance the wet performance and on-snow performance of the tire as a whole with suppressing uneven wear by forming the inner region circumferential main grooves 4 into a rectangular wave-like zigzag groove. Particularly, in this embodiment is shown a case where an angle α2 of the second groove wall portion 25b with respect to a normal line to the tread surface 2 is made larger than an angle α1 of the first groove wall portion 25a with respect to the normal line to the tread surface 2, whereby uneven wear at the ridge line 26 is further suppressed while securing the groove volume to achieve smooth drainage. It is preferable that the angle α2 is within the range of 30 to 45°. It is also preferable that a difference (α2−α1) is within the range of 10 to 25°.

In an outer ridge line 26o lying on an outer side with respect to a vehicle of the inner region circumferential main grooves 4, it is preferable from the viewpoints of dry grip performance and drainage performance that a circumferential length L1 of the first ridge line portion 26a is smaller than a circumferential length L2 of the second ridge line portion 26b, as shown in FIGS. 5(A) and 5(B). Further, in the case that a plurality of the inner region circumferential main grooves 4 are disposed as shown in this embodiment, it is preferable that as to a ratio L1/L2 of the circumferential length L1 of the first ridge line portion 26a to the circumferential length L2 of the second ridge line portion 26b in the outer ridge line 26o lying on an outer side with respect to a vehicle, a circumferential main groove 4 located on a side nearer a vehicle has a larger ratio L1/L2 than an adjacent circumferential main groove 4 located on a side far from the vehicle. Specifically, in case of this embodiment, the ratio L1/L2 in the second inner region circumferential main groove 4B is set to a larger value than that in the first inner region circumferential main groove 4A. By doing so, a circumferential main groove 4 closer to the ground contact edge TEi has a ratio L1/L2 closer to 1 and, therefore, projections on both sides of the groove width center can be equalized. As a result, a traction force on snow-covered road can be increased with minimizing uneven wear.

An amplitude WP in the axial direction of the circumferential main grooves 4 is preferably from 25 to 40% of the groove width Wg4 of the circumferential main grooves 4. The number of pitches of a zigzag in each of the circumferential main grooves 4A and 4B coincides with the number of projections 23 formed.

Figure 3:
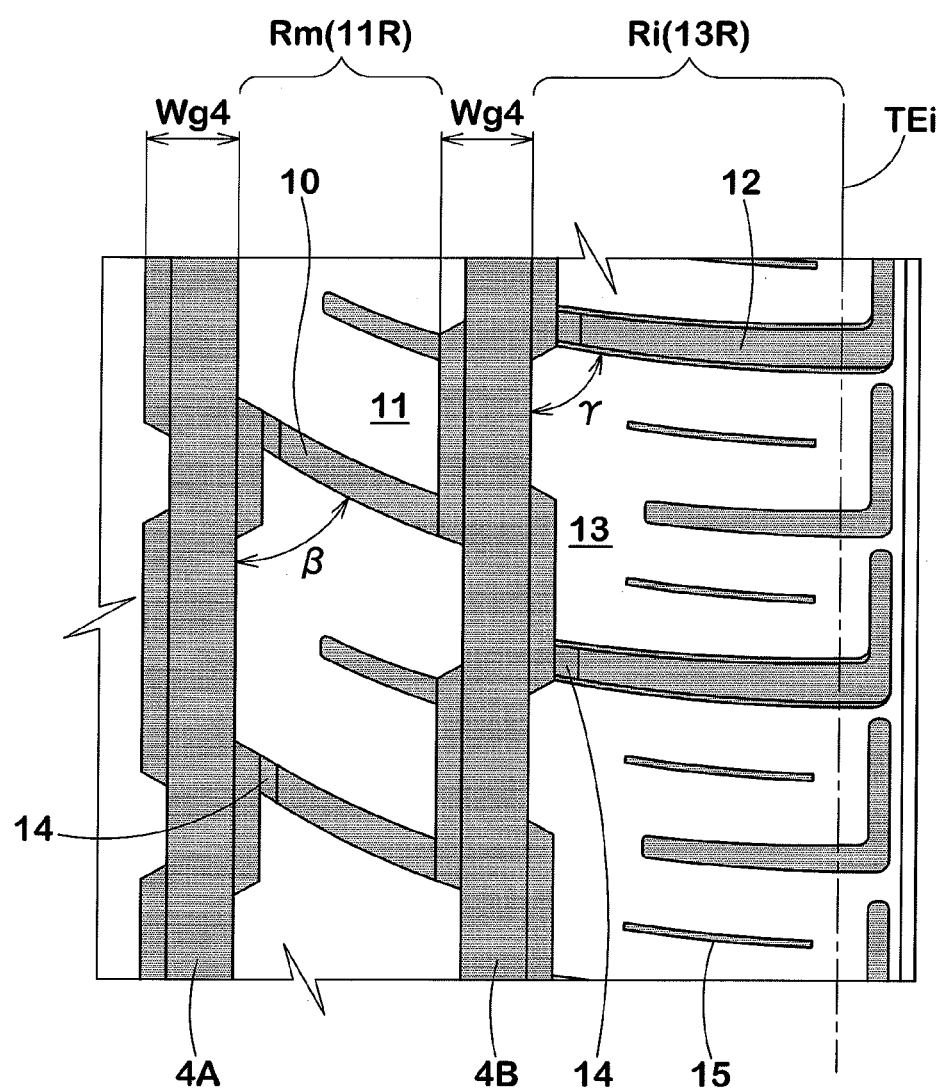
FIG. 3 is a development view of a tread pattern showing a middle region and an inner shoulder region in an enlarged form.

As shown in FIG. 3 in an enlarged form, middle lateral grooves 10 are disposed in a middle region Rm located between the first inner region circumferential main groove 4A and the second inner region circumferential main groove 4B to cross the middle region Rm in the axial direction of the tire, whereby middle blocks 11 are formed as a row 11R of middle blocks 11 disposed at intervals in the circumferential direction of the tire. An inner shoulder region Ri between the second inner region circumferential main groove 4B and the inner region ground contact edge Tei is also provided with inner lateral grooves 12 crossing the inner shoulder region Ri in the axial direction of the tire, thereby forming the inner shoulder region Ri as a row 13R of inner blocks 13 disposed at intervals in the circumferential direction.

In this embodiment, the lateral grooves 10 is inclined at an angle β of 40 to 70° with respect to the circumferential direction of the tire. The lateral grooves 12 extend at an angle γ larger than the angle β. By the way, from the viewpoint of drainage performance, it is preferable that the lateral grooves 7, 10 and 12 are inclined in the same direction with respect to the circumferential direction. These lateral grooves 10 and 12 serve to enhance a performance of cutting a water film and the drainage performance, thereby supplementing the drainage performance in the inner region 2i and securing a high level of the wet performance of the entire tread surface 2. For this purpose, it is preferable that a land proportion in the inner region 2i is as low as 40 to 49%, especially 45%, and a land proportion in the outer region 2o is as high as 60 to 70%, especially 65%. Further, as to the entire ground contact surface, it is preferable that the land proportion is within the range of 51 to 60%, especially 55%. If the land proportion in the inner region 2i is less than 40%, the ground contact area becomes too small in a vehicle with camber and the traction performance cannot be sufficiently exhibited.

Figure 10:
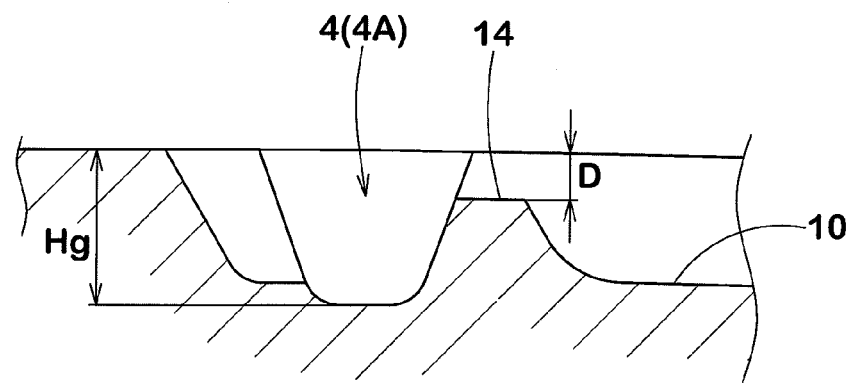
FIG. 10 is a cross sectional view along a groove width center for illustrating a tie bar in a lateral groove.
Figure 11A:
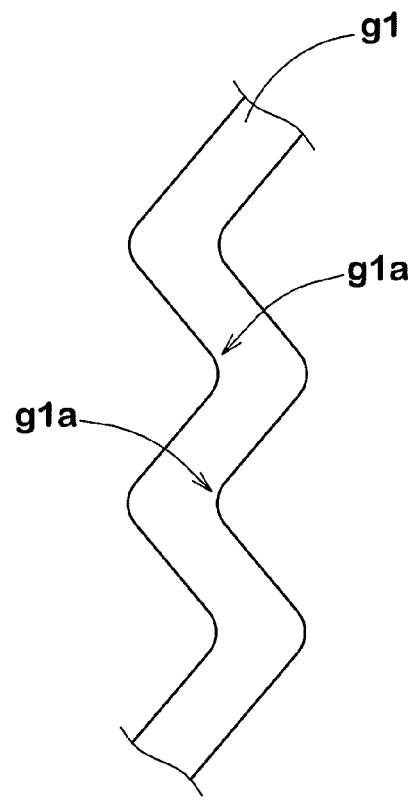
FIG. 11(A) is a plan view showing a problem in a zigzag groove.
Figure 11B:
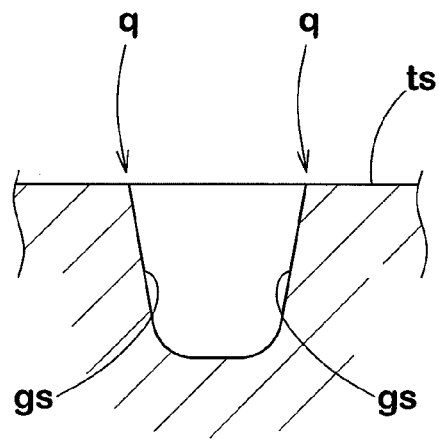
FIG. 11(B) is a cross sectional view showing a problem in a straight groove.

In this embodiment, as shown representatively by lateral groove in FIG. 10, a tie bar 14 which bulges from a groove bottom is formed in each lateral groove 7, 10 or 12 at the intersection with the circumferential main groove 3 or 4, whereby the pattern rigidity in the block row 8R, 11R or 13R is enhanced to suppress uneven wear such as heel and toe wear. Preferably, the depth D of the tie bar 14 from the tread surface 2 is from 5 to 70%, especially 15 to 40%, of the groove depth Hg of the adjacent circumferential main groove 3 or 4.

In this embodiment, as shown in FIGS. 2 and 3, sipes 15 are provided in the blocks 8 and 13 to secure an on-ice performance.

A particularly preferable embodiment of the present invention has been described, but the present invention can be modified into various embodiments and carried out without being limited to only the embodiment shown in the drawings.

EXAMPLES

In order to confirm the effects of the present invention, radial tires for passenger cars (inner structure being common to all tires) having a size of 255/40R20 and a basic pattern shown in FIG. 1 were manufactured based on the specifications shown in Table 1, and were tested with respect to cornering performance (on dry road), uneven wear resistance and on-snow performance. Comparative Example 1 and Example 1 are the same except the outer region circumferential main groove 3. Example 1 and Example 2 are the same except the inner region circumferential main grooves 4A and 4B.

<On-Snow Performance>

The tires were mounted on rims (20×9.0JJ) and attached to four wheels of a passenger car (Japanese 3,500 cc 4WD vehicle) under an inner pressure of 230 kPa. The test car was run on a tire test course of a snow-covered road, and steering stability including braking performance was evaluated by a driver's feeling. The results are shown by an index based on a result of Example 1 regarded as 100. The lager the value, the better the on-snow performance.

<Cornering Performance>

The above-mentioned vehicle was run on a dry test course (including a handling road). Grip level and marginal level in cornering were evaluated by a driver's feeling. The results are shown as an index based on the result of Example 1 regarded as 100. The larger the value, the better the cornering performance and steering stability on a dry road.

<Uneven Wear Resistance>

The above-mentioned vehicle was run 30 km on the test course in a marginal running mode, and chipping of rib and blocks and presence of uneven wear were visually observed. The results are shown as an index based on the result of Example 1 regarded as 100. The larger the value, the better the uneven wear resistance.

TABLE 1

|  | Example 1 | Com. Ex. 1 | Example 2 |
|---|---|---|---|
| Outer region circumferential main groove 3 | Straight groove | Straight groove | Straight groove |
| Groove width Wg3 (mm) | 19.5 | 19.5 | 19.5 |
| Groove depth Hg3 (mm) | 8 | 8 | 8 |
| Presence of projections | yes | no | yes |
| Angle θ1 of upper wall surface portion (°) | 45 | 45 | 45 |
| Angle θ2 of lower wall surface portion (°) | 40 | 20 | 40 |
| Angle θ3 of slope surface of projections (°) | 25 | — | 25 |
| Angle λ of circumferential end surface of projections (°) | 20 | — | 20 |
| Depth hU of upper wall surface portion (mm) | 2.5 | 2.5 | 2.5 |
| Circumferential sub-groove 6 | | | |
| Groove width Ws6 (mm) | 2.5 | 2.5 | 2.5 |
| Circumferential sub-groove 9 | | | |
| Groove width Ws9 (mm) | 5.0 | 5.0 | 5.0 |
| Inner region circumferential main groove 4A | Zigzag groove (rectangular wave) | Zigzag groove (rectangular wave) | Straight groove |
| Groove width Wg4 (mm) | 16.5 | 16.5 | 16.5 |
| Groove depth Hg4 (mm) | 8.0 | 8.0 | 8.0 |
| Inner region circumferential main groove 4B | Zigzag groove (rectangular wave) | Zigzag groove (rectangular wave) | Straight groove |
| Groove width Wg4 (mm) | 17.0 | 17.0 | 17.0 |
| Groove depth Hg4 (mm) | 8.0 | 8.0 | 8.0 |
| Cornering performance | 100 | 90 | 105 |
| Uneven wear resistance | 100 | 100 | 105 |
| On-snow performance | 100 | 80 | 70 |

*Tread ground contact width TW is 230 mm.

What is claimed is:

1. A pneumatic tire having at least one outer region circumferential main groove extending continuously in a circumferential direction of a tire and disposed in an outer region of a tread surface which faces outward of a tire equator with respect to a vehicle, said outer region circumferential main groove being a straight groove such that each of ridge lines at which groove wall surfaces on both sides of said groove intersect with said tread surface extends straight in the circumferential direction, each of said groove wall surfaces comprising a gently-inclined upper wall surface portion which extends downwardly from each of said ridge lines at an angle θ1 of 40 to 60° with respect to a normal line to the tread surface, and a steeply-inclined lower wall surface portion which is continuous with a lower end of said upper wall surface portion and extends up to a groove bottom at an angle θ2 smaller than said angle θ1, said lower wall surface portion including projections disposed at intervals in the circumferential direction, said projections having a triangular cross section and projecting from said lower wall surface portion toward a groove width center with a slope surface extending from said lower end of said upper wall surface portion up to said groove bottom at an angle θ3 which is not greater than said angle θ1 but is greater than said angle θ2, at least one inner region circumferential main groove extending continuously in the circumferential direction is disposed in an inner region of said tread surface which faces inward of the tire equator with respect to a vehicle, and said inner region circumferential main groove being formed into a rectangular wave-like zigzag groove such that each of ridge lines at which wall surfaces on both sides of the grooves intersect with the tread surface, comprises a first ridge line portion located on a groove width center side and extending straight in the circumferential direction and a second ridge line portion located outside of said first ridge line portion and extending straight in the circumferential direction.

2. The pneumatic tire of claim 1, wherein each of said wall surfaces of said inner region circumferential main groove includes a first groove wall portion extending from said first ridge line portion to a groove bottom and a second groove wall portion extending from said second ridge line portion to a groove bottom, and an angle α2 of said second groove wall portion with respect to a normal line to the tread surface is larger than an angle α1 of said first groove wall portion with respect to the normal line to the tread surface.

3. The pneumatic tire of claim 2, wherein in an outer ridge line lying on an outer side with respect to a vehicle of said inner region circumferential main groove, a circumferential length L1 of said first ridge line portion is smaller than a circumferential length L2 of said second ridge line portion.

4. The pneumatic tire of claim 1, wherein in an outer ridge line lying on an outer side with respect to a vehicle of said inner region circumferential main groove, a circumferential length L1 of said first ridge line portion is smaller than a circumferential length L2 of said second ridge line portion.

5. The pneumatic tire of claim 1, wherein a plurality of said inner region circumferential main grooves are disposed, and the inner region circumferential main groove located on a side nearer the vehicle has a larger ratio L1/L2 than the adjacent inner region circumferential main groove located on a side far from the vehicle, in which L1 and L2 denote a circumferential length for an outer ridge line lying on an outer side with respect to the vehicle of said inner region circumferential main grooves, L1 denotes the circumferential length of said first ridge line portion, and L2 denotes the circumferential length of said second ridge line portion.

6. The pneumatic tire of claim 1, wherein an outer shoulder region located between said outer region circumferential main groove and a ground contact edge in said outer region is provided with a narrow circumferential sub-groove extending in a zigzag form in the circumferential direction and having a groove width of less than 8 mm.

7. The pneumatic tire of claim 1, wherein an outer shoulder region located between said outer region circumferential main groove and a ground contact edge in said outer region and an inner shoulder region located between said inner region circumferential main groove and a ground contact edge in said inner region are provided with lateral grooves crossing each shoulder region in the axial direction, whereby each shoulder region is formed as a row of blocks disposed at intervals in the circumferential direction.

* * * * *